United States Patent [19]

McConachie

[11] 4,265,095

[45] May 5, 1981

[54] APPARATUS FOR STORING AND DISPENSING LEAFY VEGETABLES

[76] Inventor: John W. McConachie, 421 May St., Elmhurst, Ill. 60126

[21] Appl. No.: 53,222

[22] Filed: Jun. 29, 1979

[51] Int. Cl.³ .......................................... F25D 17/02
[52] U.S. Cl. ..................................... 62/373; 62/457; 62/465
[58] Field of Search ............... 62/64, 373, 457, 459, 62/465, 466, 371

[56] References Cited

U.S. PATENT DOCUMENTS

| | | | |
|---|---|---|---|
| 271,241 | 1/1883 | Hobbs | 62/457 |
| 493,326 | 3/1893 | Beard | 62/457 |
| 653,567 | 7/1900 | Collins | 62/457 |
| 885,475 | 4/1908 | Hitchcock | 62/457 |
| 1,782,720 | 11/1930 | Franklin | 62/459 |
| 1,868,763 | 7/1932 | Raymond | 62/459 |
| 1,961,337 | 6/1934 | Cornell | 62/101 |
| 2,155,399 | 4/1939 | Bruce | 62/64 |
| 2,652,696 | 9/1953 | McCann et al. | 62/457 |
| 3,213,639 | 10/1965 | Schumacher et al. | 62/64 |
| 3,296,818 | 1/1967 | Buxton | 62/64 |
| 3,368,366 | 2/1968 | Keeling | 62/64 |
| 3,387,650 | 6/1968 | Hoffmann et al. | 62/457 |
| 3,703,088 | 11/1972 | Moorhead | 62/459 |
| 3,710,589 | 1/1973 | Brown et al. | 62/459 |

*Primary Examiner*—Ronald C. Capossela
*Attorney, Agent, or Firm*—Hume, Clement, Brinks, Willian & Olds, Ltd.

[57] ABSTRACT

Apparatus for storing and dispensing leafy vegetables, comprising a container having an aperture and a side wall therein; means for dispensing chilled water within said container above said aperture; and means for supporting leafy vegetables within the container below the water dispensing means and inclined toward the aperture. An additional feature is a shelf extending outwardly from the container adjacent the aperture and inclined toward the interior of the container.

11 Claims, 2 Drawing Figures

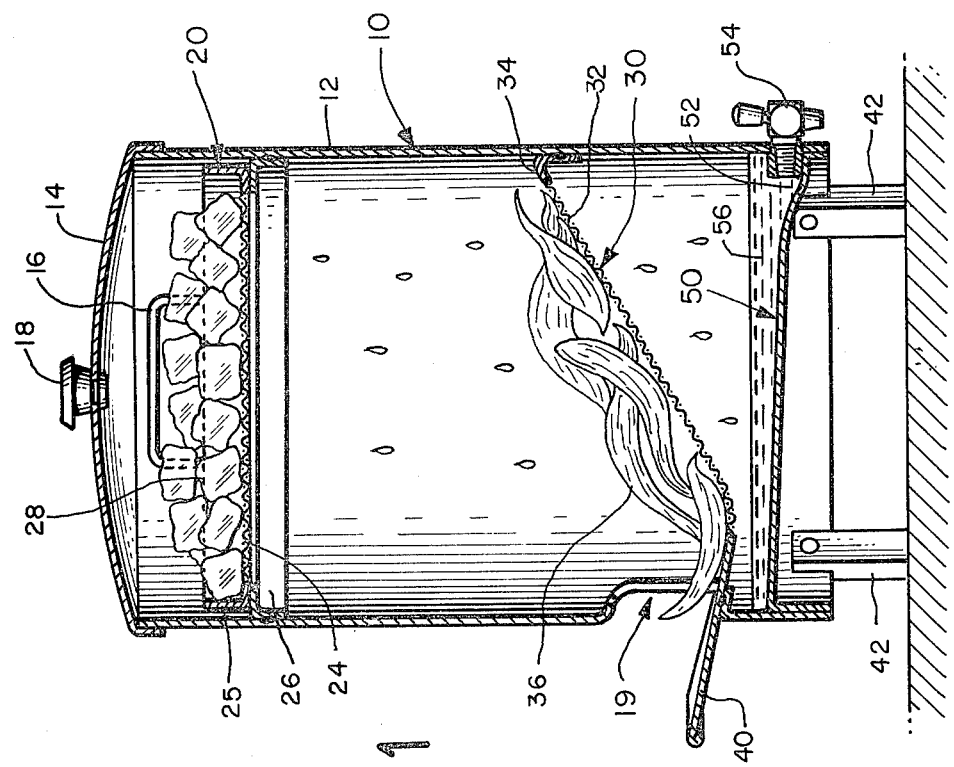
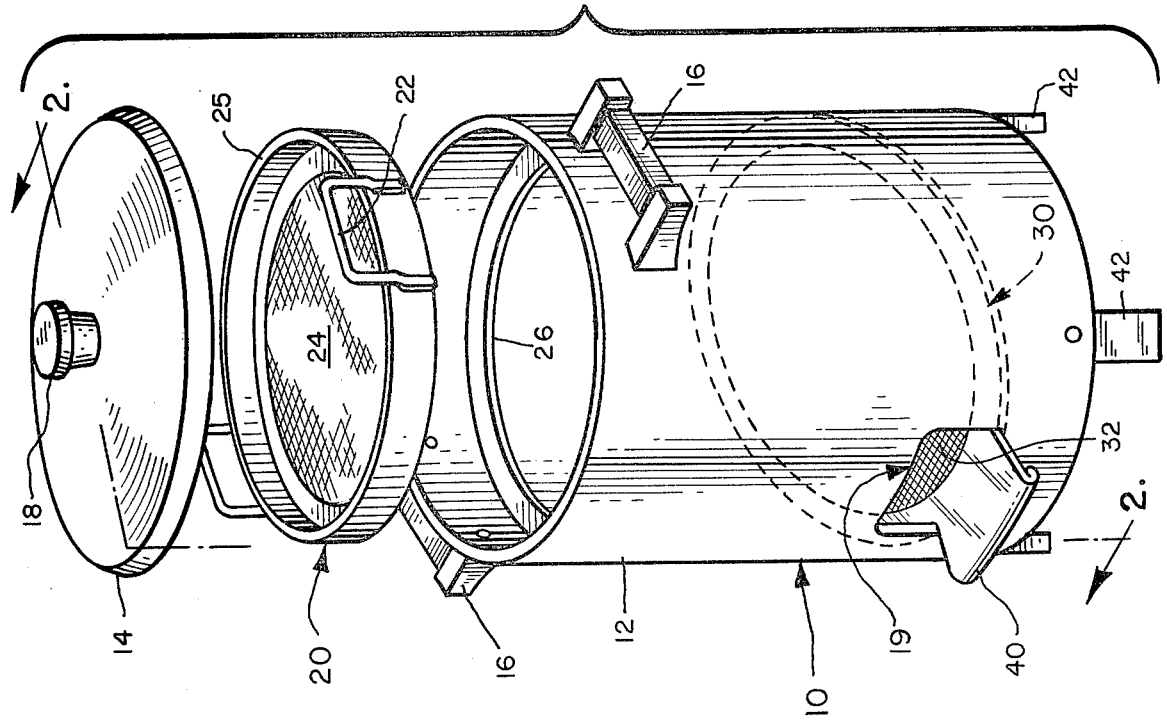

APPARATUS FOR STORING AND DISPENSING LEAFY VEGETABLES

BACKGROUND AND SUMMARY OF THE INVENTION

The present invention relates to an apparatus for storing and dispensing leafy vegetables, such as lettuce. In particular, the present invention is suited for dispensing lettuce which has been removed from the head or stalk and broken into pieces suitable for use in salads.

Many restaurants have salad bars, at which lettuce is presented in pieces for use by restaurant patrons in making salads. At such salad bars, the lettuce is typically kept in an open, unrefrigerated bowl, and lettuce is removed with tongs and placed in salad bowls by the patrons. The bowls are sometimes placed on a bed of ice in an attempt to keep the lettuce cold.

The condition and quality of the lettuce at the salad bars is important for the enjoyment of the salad by restaurant patrons. Lettuce is most tasty when it is served clean, crisp, and chilled. When left exposed and unchilled at room temperature, it becomes warm and limp. It is known that the rather limp or wilted condition of the lettuce is due to loss of turgidity in the lettuce. The turgidity of lettuce can be improved by passing cold water over the lettuce before serving. It is believed that other leafy vegetables become warm and wilted due to loss of turgidity, and the turgidity can similarly be improved by passing cold water over the vegetables before serving.

A bowl assembly for chilling salads is disclosed in U.S. Pat. No. 3,710,589. According to that disclosure, a bowl assembly is provided having a first bowl in which salad is placed and a second bowl within which the first bowl is at least partially received, so that there is a space between the bowls for holding water to be frozen to maintain the salad in the chilled condition. While the arrangement disclosed in that patent does chill the salad and the lettuce therein, no water is added directly to the lettuce to maintain or restore its turgidity and to keep it clean.

Also known is a chipped ice bowl as disclosed in U.S. Pat. No. 885,475. The bowl has an ice-containing chamber positioned above a drain chamber for water produced by the melting ice. However, the purpose of the invention is to maintain food and ice in the ice-containing chamber in a relatively dry state, and water in another chamber, which can be easily drained off without disturbing the food and ice in the other chamber. Again, because water is kept from the food in the ice chamber, the apparatus is not well suited to maintain or restore the turgidity of lettuce.

It is an object of the present invention to present an improvement over the prior art apparatus, and eliminate disadvantages in the prior art. In contrast to the prior art apparatus for storing and dispensing leafy vegetables in a ready-to-eat condition, the present invention provides a simple and economical means for keeping leafy vegetables cleaned and chilled, and restoring or maintaining their turgidity through contact with chilled water. The apparatus of the present invention is portable, and is adapted to provide ready access for dispensing lettuce and other leafy vegetables in a ready-to-eat state. It is contemplated, for instance, that the present invention can be used for dispensing lettuce and leafy vegetables at restaurants such as in salad bars.

Thus, according to the present invention, an apparatus is provided comprising a container having an aperture in a side wall, a means for dispensing chilled water within said container above the aperture, and a means for supporting leafy vegetables within the container below the water dispensing means. The means for supporting the vegetables is inclined toward the aperture so that the vegetables are presented at the aperture for easy removal.

An additional feature of the present invention is a shelf extending outwardly from the container adjacent the aperture, and inclined toward the interior of the container. The shelf provides a type of loading area for the lettuce or leafy vegetables as they are inclined toward the aperture.

The means for dispensing the chilled water is preferably a tray having a perforated or screen surface, supported within the container above the aperture. This tray provides a means for supporting ice within the container above the aperture, the screen or perforations permitting water created by melting ice to pass therethrough. There is also provided, beneath the lettuce or vegetable supporting means, a base which is inclined to form a water well. A spigot is positioned at the water well to drain off water which has melted and passed over the lettuce.

Other advantages, objects, and features of the present invention will become apparent upon reading the following detailed description of the preferred embodiment in conjunction with the accompanying drawings which are schematic representations, and are not drawn to scale.

BRIEF DESCRIPTION OF THE DRAWINGS

FIG. 1 is an exploded perspective view of the apparatus for storing and dispensing leafy vegetables according to the present invention; and FIG. 2 is a side, cross-sectional view taken along line 2—2 of FIG. 1, showing the apparatus in a closed and operating condition, with ice and lettuce therein.

DESCRIPTION OF THE PREFERRED EMBODIMENT

Referring now to the drawings, and more particularly to FIGS. 1 and 2, there is illustrated an apparatus for storing and dispensing leafy vegetables, indicated generally by reference numeral 10. The apparatus is particularly suited for storing and dispensing lettuce in a ready-to-eat form. Other leafy vegetables, such as cabbage, endive and other salad greens may also be stored in and dispensed from the apparatus of the present invention.

The apparatus of the present invention also includes a container 12 and a means 20 for supporting ice within the container. A cover 14 for the container is also provided, along with a knob 18 for grasping the cover 14. Handles 16 are on either side of the container 12 for ease of lifting and carrying the apparatus 10.

The ice supporting means 20 is a tray including a screen 24 for supporting ice 25 in the form of cubes or blocks. Water from melting ice is permitted to pass through the screen 24 onto lettuce 36 within the container 12. Alternatively, other types of perforated or apertured surfaces may be provided in the ice supporting tray 20 to permit water to pass therethrough.

The tray 20 is supported within the container in the preferred embodiment by a ring 26 welded to the inner surface of the container 12. However, any suitable means to support the ice tray may be provided, such as welding the tray 20 directly to the container, supporting the tray 20 on studs (not shown) welded to the inside of the container 12, or hanging the tray 20 from the upper surface of the walls of the container 12.

The container 12 has an aperture 19 provided in a wall thereof near a lower end of the container 12. In the preferred embodiment the aperture 19 also has a shelf 40 extending therefrom, inclined backward at an angle toward the interior of the container 12. Adjacent the aperture 19 is a lettuce-supporting means or base 30, which is preferably inclined toward the aperture 19 so as to present lettuce 36 from the storage container 12 at the aperture 19.

The inclined support means 30 has a support ring 34 and a screen or wire mesh 32 in the center portion of the base 30. Pieces of lettuce 36 are supported on the support screen 32, yet water passes through the screen 32 to an area below the lettuce 36. In this manner, water does not accumulate on the lettuce 36 and cause the lettuce 36 to spoil or become excessively waterlogged.

At the bottom of the container 12 beneath the lettuce support 30, there is provided a base 50, which is inclined to provide a water well area 52. Water from the melting ice which has dripped down over the lettuce 36 in the container 12 reaches the base 50 and then collects in the water well area 52. When the level of water 56 approaches the lowermost portion of the aperture 19, or at other suitable times, the water may be drained through a spigot 54 provided near the lowermost end of the inclined base 50 at the water well area 52.

Legs 42 are also provided on the container 12 near the base 50 so that the container 12 is supported above the table or other space on which it rests, and thus a water-receiving container (not shown) can be placed under the spigot 54.

The container 12 may be made of any suitable material such as metal or plastic. The lettuce support 30 preferably has a somewhat horizontal portion near the aperture 19 so as to provide a loading area for lettuce 36 which is directed toward the opening 19. The shelf means 40 which extends through the aperture 19 into the container 12 cooperates with the somewhat horizontal portion of the lettuce screen 30 to provide the lettuce loading area. Furthermore, the container 12 may be provided with thermal insulation (not shown) to retain the cold temperature within the container, so as to maintain the lettuce in chilled condition, and to slow the process of melting the ice 28.

Though the embodiment hereinbefore described is preferred, many other modifications and refinements which do not depart from the true spirit and scope of the invention may be conceived by those of ordinary skill in the art. It is intended that all such modifications and refinements be covered by the following claims.

I claim:

1. An apparatus for storing and dispensing leafy vegetables, comprising:
   a container having an aperture in a side wall;
   a tray having a perforated surface, said tray being adapted to fit within said container;
   means for supporting said tray within said container; and
   means for supporting leafy vegetables within said container below said tray, said means inclined towards the aperture in said container.

2. An apparatus for storing and dispensing leafy vegetables, comprising:
   a container having an aperture in a side wall therein;
   means for supporting ice within said container above said aperture, said means permitting water created by melting ice to pass therethrough; and
   means for supporting leafy vegetables within said container below said ice supporting means, said means inclined towards said aperture.

3. The apparatus of claim 2 wherein the means for dispensing chilled water comprises a means for supporting ice within said container above said aperture, said means permitting water created by melting ice to pass therethrough.

4. The apparatus of claims 1 or 2 further including a shelf extending outwardly from said container adjacent a lower surface of said aperture.

5. The apparatus of claim 4 wherein said shelf is incliined toward the interior of the container.

6. The apparatus of claims 1 or 2 further including an inclined base for said container.

7. The apparatus of claim 6 further including a spigot inserted into said container near the lowermost end of said inclined base.

8. A lettuce storage and dispensing apparatus comprising:
   a generally cylindrical container having an aperture in a side wall;
   an ice supporting screen positioned within said container above said aperture;
   a lettuce-supporting screen positioned beneath said ice supporting screen and inclined toward said side wall aperture; and
   a shelf adjacent said side wall aperture extending outwardly from said container.

9. The lettuce storage apparatus of claim 8 further including a base means for collecting water created by ice melting on said ice supporting screen.

10. The lettuce storage apparatus of claim 8 wherein the shelf is inclined toward the interior of said container.

11. The lettuce storage apparatus of claim 8 further including a cover for said container.

* * * * *

UNITED STATES PATENT AND TRADEMARK OFFICE
CERTIFICATE OF CORRECTION

PATENT NO. : 4,265,095
DATED : May 5, 1981
INVENTOR(S) : John W. McConachie

It is certified that error appears in the above-identified patent and that said Letters Patent are hereby corrected as shown below:

At column 4, lines 21-25, cancel claim 3, without prejudice; and

At column 4, line 30, delete "iined" and insert therefor --ined--

Signed and Sealed this

Sixth Day of October 1981

[SEAL]

Attest:

GERALD J. MOSSINGHOFF

Attesting Officer

Commissioner of Patents and Trademarks